United States Patent [19]

Tsuchiya et al.

[11] Patent Number: 5,278,707
[45] Date of Patent: Jan. 11, 1994

[54] TAPE LOADING MECHANISM FOR MAGNETIC RECORDING AND/OR REPRODUCING APPARATUS

[75] Inventors: Naoko Tsuchiya, Yokohama; Masao Iwakura, Fujisawa; Hidekazu Takeda, Fujisawa; Kyuichirou Nagai, Fujisawa; Ikuo Nishida, Katsuta; Yoshiharu Yamashita, Katsuta; Koji Iyota, Katsuta; Motonori Ohmori, Katsuta; Kenji Ogiro, Yokohama, all of Japan

[73] Assignee: Hitachi, Ltd., Tokyo, Japan

[21] Appl. No.: 723,607

[22] Filed: Jul. 1, 1991

[30] Foreign Application Priority Data

Jun. 29, 1990 [JP] Japan .................. 2-170045

[51] Int. Cl.⁵ ............................. G11B 5/027
[52] U.S. Cl. ...................................... 360/85
[58] Field of Search .......... 360/85, 95, 81, 96.3

[56] References Cited

U.S. PATENT DOCUMENTS 4,697,214 9/1987 Sasakawa ........................... 360/85
4,975,793 12/1990 Oka ..................................... 360/85

Primary Examiner—Paul M. Dzierzynski
Assistant Examiner—Richard Hanig
Attorney, Agent, or Firm—Antonelli, Terry, Stout & Kraus

[57] ABSTRACT

A plurality of tape guides are moved to wind a magnetic tape on a rotatable cylinder when the magnetic tape is to be loaded. An auxiliary guide mounted on a chassis of a magnetic recording and/or reproducing apparatus in position is made to touch the magnetic tape during a period for which the magnetic tape is being loaded, but it does not touch the magnetic tape when the magnetic tape has been loaded. The auxiliary guide can be protruded toward the magnetic tape from between the tape guides moving to touch the magnetic tape during the period for which the magnetic tape is being loaded so that the magnetic tape can be kept to a predetermined span.

24 Claims, 10 Drawing Sheets

TAPE LOADING MECHANISM FOR MAGNETIC RECORDING AND/OR REPRODUCING APPARATUS

BACKGROUND OF THE INVENTION

The present invention relates to a tape loading mechanism for magnetic recording and/or reproducing apparatus, and, more particularly to a tape loading mechanism for magnetic recording and/or reproducing apparatus which can prevent a magnetic tape from being damaged during tape loading process to accomplish highly reliable tape loading.

In usual tape loading mechanisms for magnetic recording and/or reproducing apparatuses in which a magnetic tape is used to record and/or play back signals as recording medium, the magnetic tape is pulled out of a tape cassette in recording or playing back, is wound on a rotatable cylinder having magnetic heads built therein to form a tape traveling path, and is retracted for the tape traveling path into the tape cassette at the end of recording or play-back. The tape loading mechanisms heretofore used for magnetic recording and/or reproducing apparatuses are desirable in some fields. However, they have the disadvantage in that they involve mechanism to a great extent in view of small size and light weight construction as the entire structure is determined greatly depending on forming the tape traveling path as the mechanism.

Therefore, many types of tape traveling system have been proposed to make the entire apparatus small size and light weight. The apparatus described, for example, in the Japanese Patent Application Laid-Open No. 55-160362 was designed so that magnetic tape in a tape cassette is led toward a tape approaching side for a revolving cylinder in a slanted direction by tape guides while its height is being changed in reference to a chassis, and the magnetic tape is led to a tape leaving side of the revolving cylinder by other tape guides. The apparatus is very desirable in making its entire body thin as it is possible to form a tape traveling path having large difference of a tape approaching height to the cylinder from a tape cassette height with the cylinder being made upright to the chassis.

However, the apparatus have the disadvantages described below. The tape is drawn out of the tape cassette as its height is gradually changed with it being contact with a plurality of tape guides. The tape may be twisted between the tape guides unless postures of the tape guides are precisely controlled in loading or unloading. This results in that the widthwise tension distribution of the tape is not made uniform so that the tape tends to move the widthwise of each tape guide. This causes the tape to strongly touch the flange of the tape guide, damaging it.

If the postures of the tape guides are attempted to be precisely controlled to prevent the tape from being damaged, then the loading mechanism is complicated.

In order to overcome above mentioned disadvantages, an improved tape loading mechanism was disclosed in the Japanese Patent Application Laid-Open No. 62-124651 in which a movable auxiliary guide member was provided near the tape traveling path to touch only the magnetic tape on the course of loading, and can be retracted from the tape traveling path at the end of loading.

SUMMARY OF THE INVENTION

The previous tape loading mechanisms described heretofore have the advantages in preventing the tape from being damaged in loading or unloading. However, as the auxiliary guide is moved to touch the tape to correct its posture, it is necessary to provide a space for moving the auxiliary guide in addition to the space for moving the group of tape guides which form the tape traveling path at the end of loading. This means that they are limited in reducing the size of the entire apparatuses.

In view of the foregoing, it is an object of the present invention to provide a tape loading mechanism for magnetic recording and/or reproducing apparatus in which magnetic tape can be prevented from being damaged in loading and at the same time, which can be made compact in a way that an auxiliary guide is arranged in a least amount of space.

According to the present invention, the auxiliary guide for correcting the posture of the tape in loading is not moved as fixed on a chassis. According to the present invention, the auxiliary guide touches only the tape in loading, but is free from it at the end of loading not to adversely affect the tape traveling performance in operation.

Briefly, the foregoing object is accomplished in accordance with aspects of the present invention by the tape loading mechanism for magnetic recording and/or reproducing apparatus in which the auxiliary guide held on the chassis can correct the posture of the tape, the tape guides touching the tape cannot make it move widthwise to prevent excessive contact to the guide flanges, thereby assuring of damage-less stable loading operation. The auxiliary guide needs no moving space. These features allow the tape loading mechanism to be made compact, thus accomplishing greatly small sized apparatus.

BRIEF DESCRIPTION OF THE DRAWINGS

Other objects and advantages of the present invention will further become apparent thereinafter and in the drawings in which.

DETAILED DESCRIPTION OF EMBODIMENTS

Figure 1:
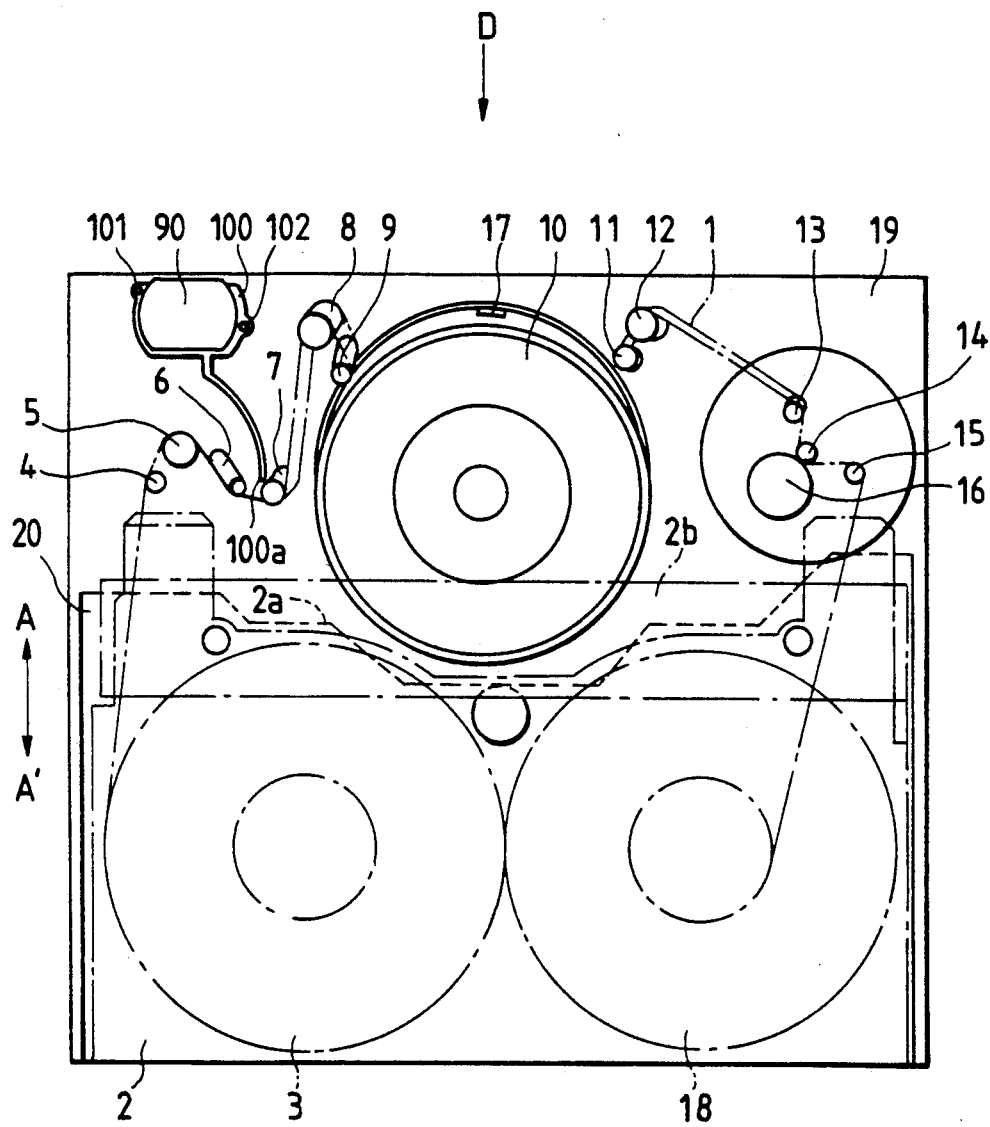
FIG. 1 is a plan view of a magnetic recording and/or reproducing apparatus according to a first embodiment of the present invention.

Referring now to the drawings wherein like reference numerals are used throughout the various views to designate like parts and, more particularly, to FIG. 1, according to this figure, a magnetic recording and/or reproducing apparatus includes a magnetic tape 1, a tape cassette 2, an opening space 2a, a front cover 2b, a supply reel 3, a tension pin 4, a guide roller 5, an inclined pin 6, other guide rollers 7 and 8, another inclined pin 9, a rotatable cylinder 10, another inclined pin 11, another guide roller 12, other inclined pin 13, a capstan 14, a fixed guide 15, a pinch roller 16, a magnetic head 17, a take-up reel 18, a main chassis 19, a movable chassis 20, a loading motor 90, an auxiliary guide member 100, and screws 101 and 102 for fixing the auxiliary guide member 100.

In the embodiment of FIG. 1, the rotatable cylinder 10 and the tape cassette 2 are overlapped in one plane to reduce the size of the mechanism in a loading end state.

In FIG. 1, the rotatable cylinder 10 having the magnetic head 17 is fixed through a cylinder holding member (not shown) on the main chassis 19. Also, there is provided the movable chassis 20 which is movable to a predetermined distance in an A—A' direction. If the tape cassette 2 is not loaded, the movable chassis 20 is positioned at a farthest limit position from the rotatable cylinder 10 in the A' direction.

If the tape cassette 2 is inserted from a cassette inlet (not shown), the tape cassette 2 is put on the movable chassis 20. The movable chassis 20 is moved in the direction of the arrow A so that the tape cassette 2 can be loaded at a nearest limit position to the rotatable cylinder 10. With the tape cassette 2 loaded on the movable chassis 20, the front cover 2b of the tape cassette 2 is opened. When the tape cassette 2 is positioned at the limit position (load position) in the direction of the arrow A, the opening space 2a of the movable chassis 20, exposed by opening of the front cover 2b, has parts of the rotatable cylinder 10 put received therein.

Such operations are interlocked with the tension pin 4, the guide rollers 5 and 8, and the inclined pin 9. These are positioned on and moved from a side to the supply reel 3 in the opening space 2a of the cassette. They are also interlocked with the inclined pin 11, the guide roller 12, the inclined pin 13, the fixed guide 15, and the pinch roller 16. These are positioned on and moved from a side to the take-up reel 18 in the opening space 2a. These movements perform a so-called tape loading operation in which the magnetic tape 1 brought out of the tape cassette 2 and wound on the rotatable cylinder 10.

FIG. 1 shows the state that such a tape loading is completed and that the magnetic tape 1 was spirally wound to a predetermined angle on the rotatable cylinder 10. In this state, on the tape incoming side for the rotatable cylinder 10, the guide roller 5, inclined pin 6, the guide rollers 7 and 8, and inclined pin 9 form a tape traveling path for the magnetic tape 1. Also, on the tape outgoing side for the rotatable cylinder 10, the inclined pin 11, the guide roller 12, the inclined pin 13, and fixed guide 15 form another tape traveling path. The capstan 14 and the pinch roller 16 pinch the magnetic tape 1 to drive.

When the tape loading is completed, as shown in FIG. 1, the tension pin 4 and the guide rollers 5 and 7, and the inclined pin 6 are positioned on a side to the tape cassette 2 rather than the guide roller 8 and the inclined pin 9 arranged near the tape incoming side for the rotatable cylinder 10. Similarly, the inclined pin 13, the capstan 14, the fixed guide 15, and the pinch roller 16 are positioned on the side to the tape cassette 2 rather than the inclined pin 11 and the guide roller 12 arranged near the tape outgoing side for the rotatable cylinder 10.

In recording or playback, revolution of the capstan 14 pulls the magnetic tape 1 out of the supply reel 3 so that it can be traveled as wound on the take-up reel 18. Revolution of the rotatable cylinder 10 allows a plurality of the magnetic heads 17 mounted thereon to scan the magnetic tape 1. The tension pin 4 detects tension of the magnetic tape 1. According to a result of the detection, a brake (not shown) for a reel base of the supply reel 3 can be controlled to keep the tension of the magnetic tape 1 constant.

Figure 2:
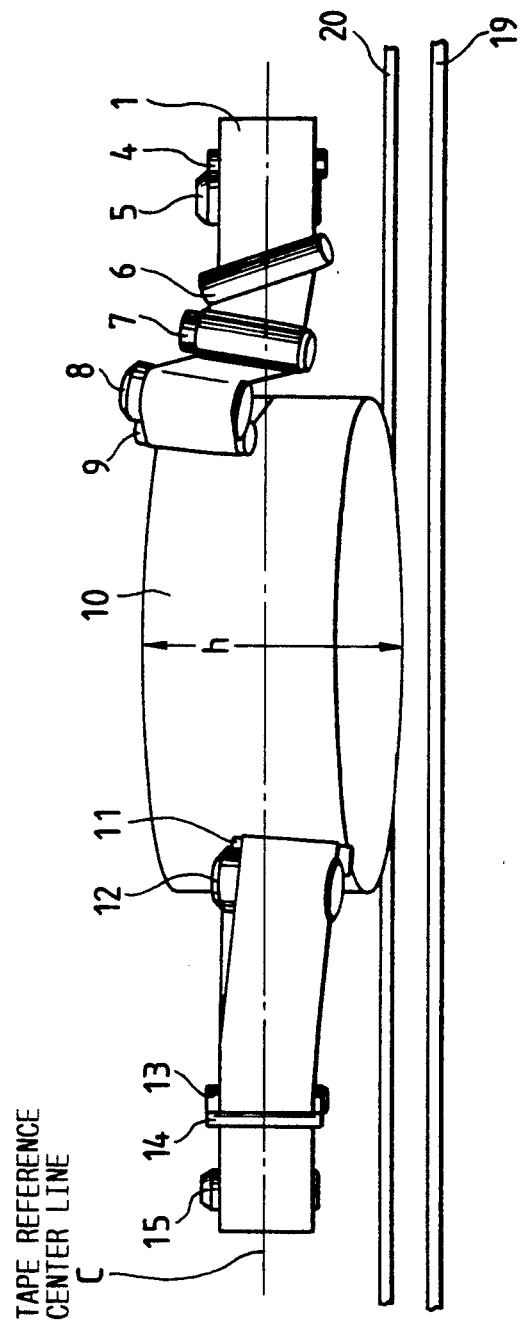
FIG. 2 is a rear view of the magnetic recording and/or reproducing apparatus of FIG. 1 as viewed in a direction of the arrow D in FIG. 1.

In order to reduce a height of the rotatable cylinder 10, this is provided virtually upright to the main chassis 19 and a surface of the movable chassis 20. In FIG. 2, a chain line C is a center line for the magnetic tape 1 in the tape cassette 2 shown in FIG. 1 (hereinafter tape reference center line). In the state that the tape loading is completed, the inclined pins 6 and 9 and the guide rollers 7 and 8 can raise up the magnetic tape 1 on the tape incoming side to the rotatable cylinder 10 in reference to the tape reference center line C. The magnetic tape 1 can be moved down in a range of winding range on the rotatable cylinder 10 so that its center line can move from an upper side of the tape reference center line C to lower. On the tape outgoing side to the rotatable cylinder 10, the s inclined pin 11 and 13 and the guide roller 12 can raise up the magnetic tape 1. The magnetic tape 1 can be changed in its traveling so that its center line can coincide with the tape reference center line C to lower.

The system in the first embodiment described above is a tilted loading system to make the apparatus thin. This results in a height difference of the center lines of the magnetic tape 1 near the incoming position of the magnetic tape 1 to the rotatable cylinder 10 and the outgoing position form the rotatable cylinder 10 from the tape reference center line C.

In turn, the following describes operation timings of the movable chassis 20 and the guides from the unloading state to the loading end state by reference to FIGS. 3 to 6.

Figure 3:
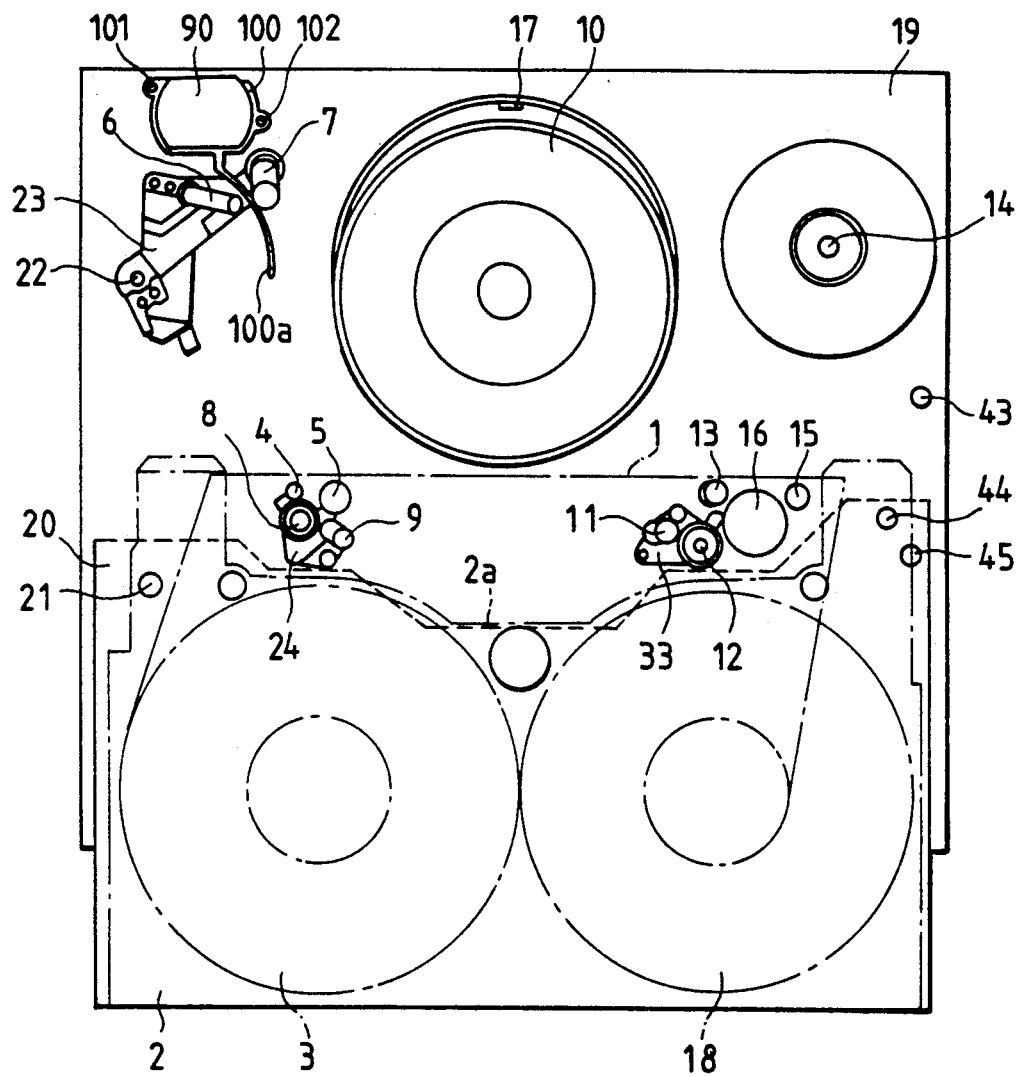
FIG. 3 is a plan view of the magnetic recording and/or reproducing apparatus of FIG. 1 in the state that a magnetic tape is unloaded.

As shown in FIG. 3, on the supply reel side of the rotatable cylinder 10, the guide roller 5 and the tension pin 4 are embedded on an arm (not shown) which is supported turnably around a shaft 21 embedded on the movable chassis 20. In the unloading state, they are contained in the opening space 2a of the tape cassette 2 as shown. The guide roller 8 and the inclined pin 9 are embedded on a guide base 24, and similarly are contained in the opening space 2a of the tape cassette 2 as shown. The guide roller 7 and the inclined pin 6 are embedded on an arm 23 supported turnably around a shaft 22 embedded on the main chassis 19. In the unloading state, they are held at a first position as shown to prevent the guide base 24 (which will be describe later) from moving.

In turn, the inclined pin 11 and the guide roller 12 are embedded on a guide base 33 on a side of the take-up reel 18 to the rotatable cylinder 10. Also, the inclined pin 13 is embedded on an arm (not shown) supported around a shaft 43 embedded on the main chassis 19. The pinch roller 16 is embedded on an arm (not shown) supported turnably around a shaft 44 embedded on the movable chassis 20. Further, the fixed guide 15 is embedded on an arm (not shown) supported turnably around a shaft 45 embedded on the movable chassis 20. These guides are contained in the opening space 2a of the tape cassette 2 in the unloading state as shown.

The auxiliary guide member 100 is fixed on the main chassis 19 by the screws 101 and 102 to wrap around the loading motor 90 so that the auxiliary guide member 100 itself can be held in its posture. The loading motor 90 can be fixed on the main chassis 19. However, the auxiliary guide member 100 may not necessarily wrap around the loading motor 90 or the like, and can be held on the main chassis 19 in another way other than the screws. In the unloading state, the auxiliary guide member 100 is arranged so that a portion 100a can pass between the inclined pin 6 and the guide roller 7 and can position near the tape cassette 2 rather than the inclined pin 6 and the guide roller 7.

Figure 4:
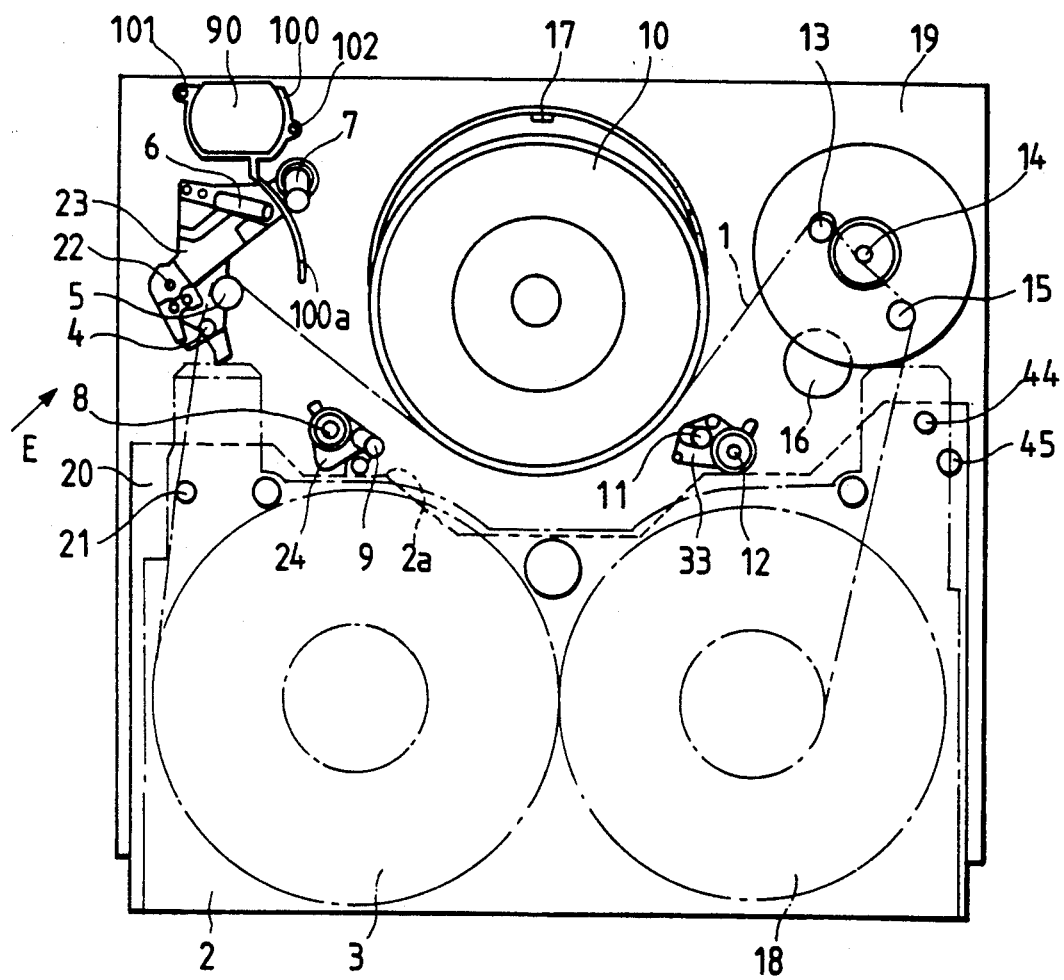
FIG. 4 is a plan view of the magnetic recording and/or reproducing apparatus of FIG. 1 in the state that the magnetic tape is on the course of loading.
Figure 5:
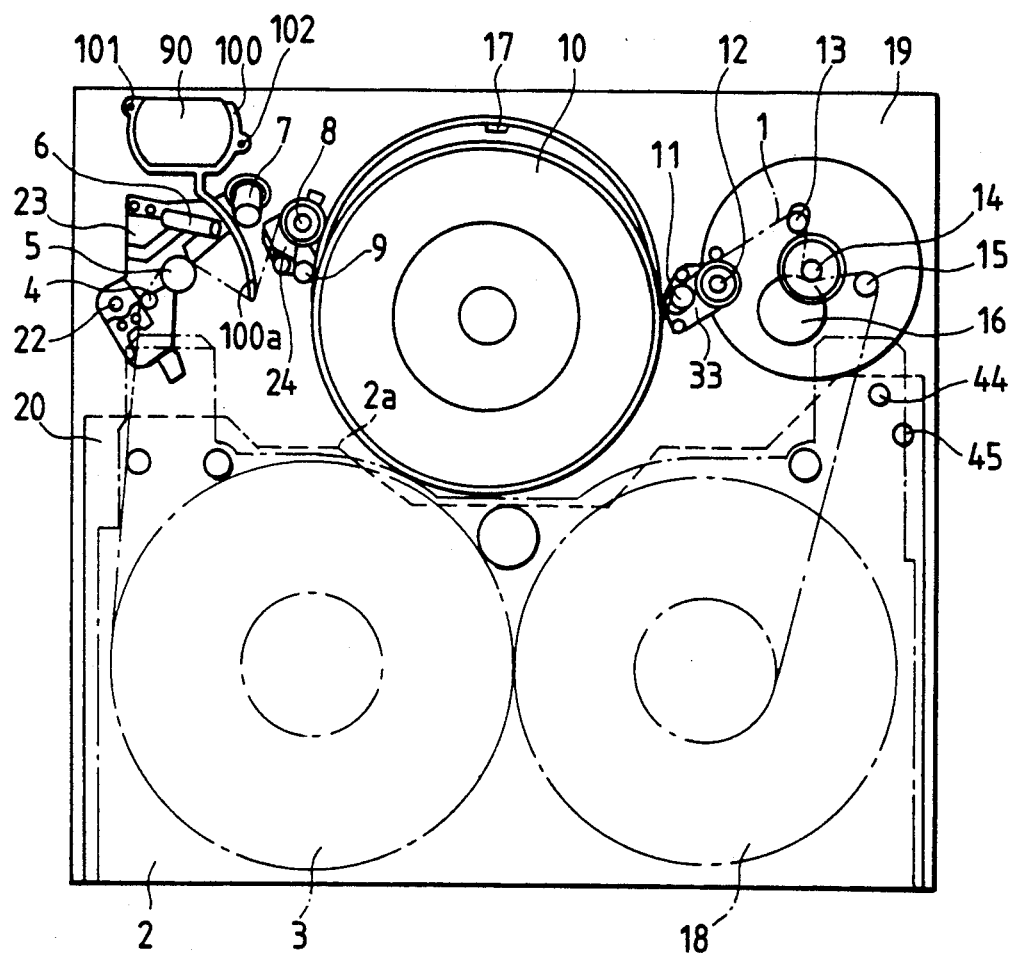
FIG. 5 is a plan view of the magnetic recording and/or reproducing apparatus in a state wherein a movable chassis in FIG. 4 is further slid to the end.
Figure 6:
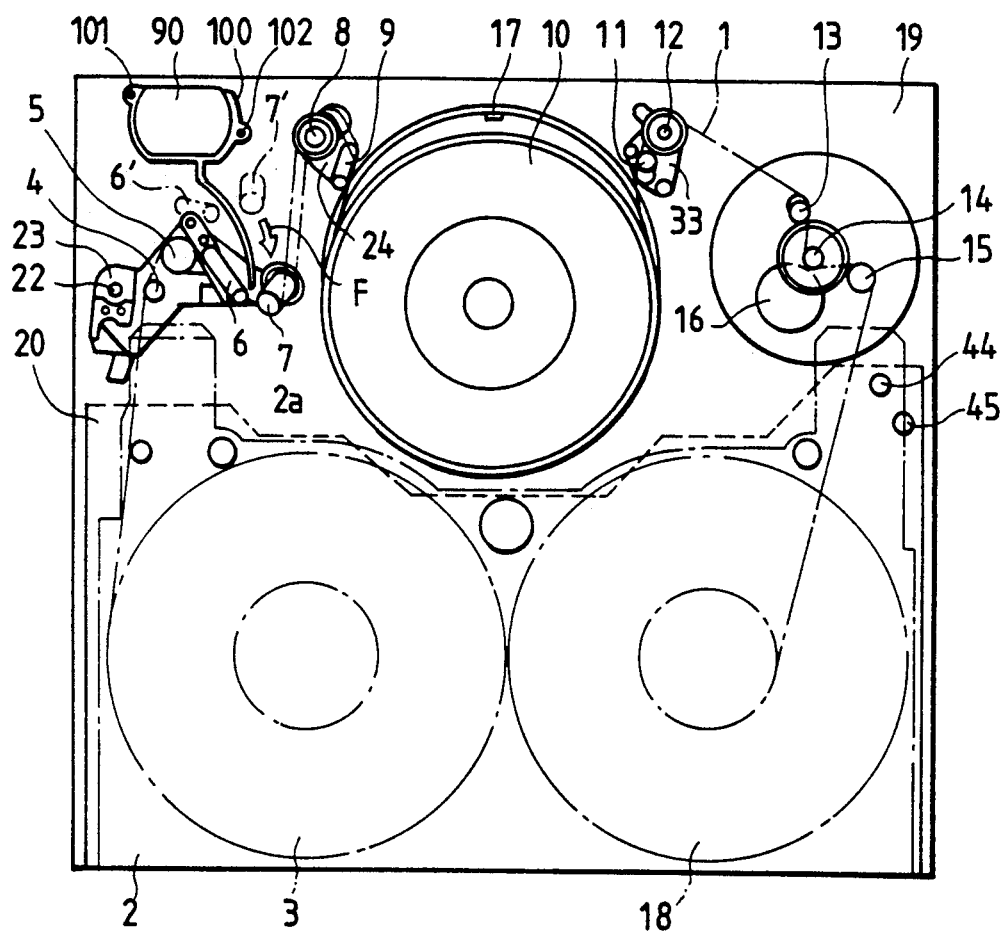
FIG. 6 is a plan view of the magnetic recording and/or reproducing apparatus of FIG. 1 in the state wherein the loading is completed.
Figure 7:
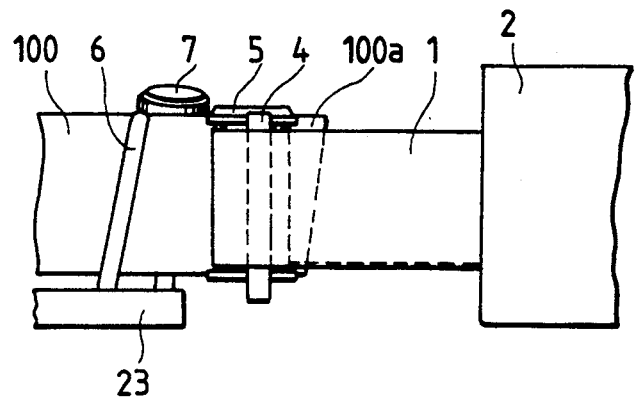
FIG. 7 is an enlarged partial side view of the magnetic recording and/or reproducing apparatus, as viewed in a directed of the arrow E in FIG. 4, for illustrating of the tape incoming side to a rotatable cylinder after the start of loading shown in FIG. 4.
Figure 8:
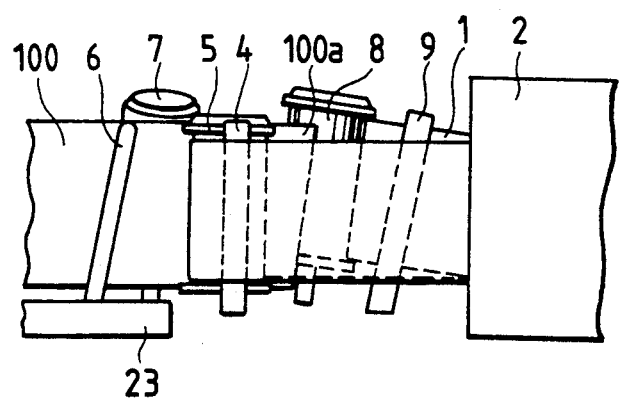
FIG. 8 is an enlarged partial side view of the magnetic recording and/or reproducing apparatus shown in FIG. 7, for illustrating a state wherein the loading is proceeding.

In turn, the following describes operation timings of the guides and the like by reference to FIGS. 4 through 6.

FIG. 4 is a plan view of the magnetic recording and-/or reproducing apparatus of FIG. 1 in the state that the magnetic tape 1 is on the course of loading. Particularly, the tape cassette 2 is in the course of sliding in FIG. 4. When the movable chassis 20 is started to slide, the tension pin 4 and the guide roller 5 are drawn out of the opening space 2a of the tape cassette 2 to the positions shown in the figure. They are slid together with the movable chassis 20 from that state. The inclined pin 13, the fixed guide 15, and the pinch roller 16 are gradually drawn out of the opening space 2a along with the sliding of the movable chassis 20. In the state shown in FIG. 4, the guide base 24 and 33 are held at fixed positions when the unloading ends in the opening space 2a. They are brought to the rotatable cylinder 10 by the distance by which the movable chassis 20 slides. The arm 23 will not be changed any (at the position in FIG. 3) as at the end of unloading.

FIG. 5 is a state that the movable chassis 20 in FIG. 4 is further slid to the end. In FIG. 5, the tension pin 4, the guide roller 5, the inclined pin 13, the fixed guide 15, and the pinch roller 16 are moved to positions that the loading is completed. The guide base 24 and 33 are driven to move to the illustrated positions by a link arrangement (not shown). The movement is made, as described above, as the guide base 24 is gradually moved up, and the guide base 33 is gradually lowered down. On the tape incoming side to the rotatable cylinder 10, the magnetic tape 1 drawn upward out of the tape cassette 2 by the guide roller 8 embedded on the guide base 24 and the inclined pin 9 is made to touch the auxiliary guide member 100. The 100a of the auxiliary guide member 100 touching the magnetic tape 1 has an inclined surface to correct possible twist of the magnetic tape 1. As the magnetic tape 1 touches the auxiliary guide member 100, its direction can be changed so that it can be guided to move upward without twist. It is further continued to be drawn out by the guide roller 8 and inclined pin 9. It should be noted that the arm 23 will be not changed any from the position shown in FIG. 3 so that the inclined pin 6 and the guide roller 7 cannot touch the magnetic tape 1 at all. That is, the inclined pin 6 and the guide roller 7 embedded on the arm 23 are separated from the rotatable cylinder 10 farther than in the state of the end of loading shown in FIG. 1. This will not prevent the guide base 24 from moving near the rotatable cylinder 10.

In FIG. 6, the guide base 24 and 33 are positioned to predetermined postures by positioning members (not shown). The arm 23 begins to move in a direction of the arrow F when the guide base 24 has passed as the loading has been further made to proceed from the state in FIG. 5. The inclined pin 6 and the guide roller 7 embedded on the arm 23 are brought to loading end positions near the tape cassette 2 rather than the auxiliary guide member 100 as shown in FIG. 6 to touch the magnetic tape 1. This completes the final tape traveling path. At this time, the magnetic tape 1 is removed from the auxiliary guide member 100 by movement of the inclined pin 6 and guide roller 7. In the loading end state, the magnetic tape 1 is not in any contact with the auxiliary guide member 100.

In turn, the following further describes function of the auxiliary guide member 100 by reference to FIGS. 7 through 10.

When the loading starts, the magnetic tape 1 is pulled out of the tape cassette 2 in parallel by the tension pin 4 and the guide roller 5. The auxiliary guide member 100, the inclined pin 6, and the guide roller 7 are in the same state as the unloading state. An end portion 100a of the auxiliary guide member 100 is projected from between the inclined pin 6 and the guide roller 7 so that it can be nearer to the tape cassette 2 than the inclined pin 6 and the guide roller 7. In this stage, however, the auxiliary guide member 100 is not yet in touch with the magnetic tape 1.

The magnetic tape 1 is drawn out in an upward direction by the guide roller 8 and inclined pin 9 embedded on the guide base 24 (see FIG. 5). The drawn magnetic tape 1 contacts the auxiliary guide member 100 between the guide roller 5 and guide roller 8, and is guided upwardly by it to correct the posture by the inclination of the 100a of the auxiliary guide member 100. At this time, the inclined pin 6 and the guide roller 7 embedded on the arm 23 are not moved from the unloading positions, not touching the magnetic tape 1 at all.

Figure 9:
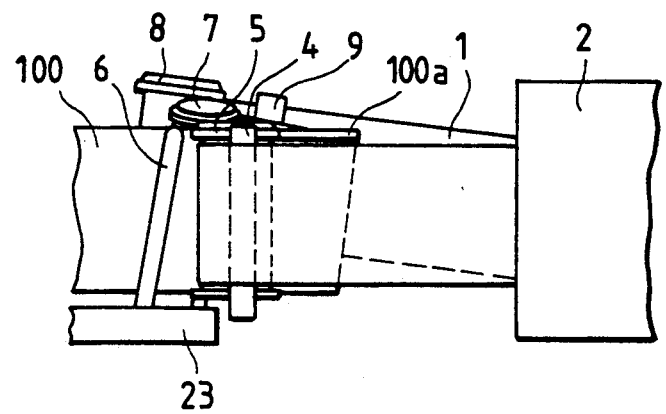
FIG. 9 is an enlarged partial side view of the magnetic recording and/or reproducing apparatus for illustrating a state wherein the loading is further proceeding from the state in FIG. 8.
Figure 10:
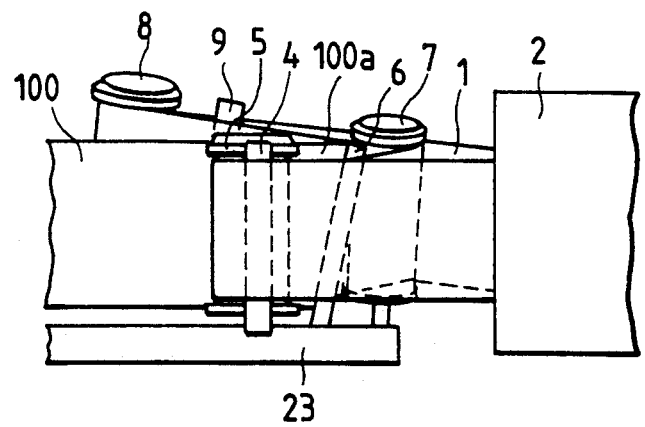
FIG. 10 is an enlarged partial side view of the magnetic recording and/or reproducing apparatus, as viewed in the directed of the arrow E in FIG. 4, for illustrating a state wherein loading is completed.

The magnetic tape 1, as shown in FIG. 9, is further drawn out upward by the guide roller 8 and the inclined pin 9. At this time, the auxiliary guide member 100 can correct the posture of the magnetic tape 1 so that it can prevent the tape from twisting between the guides to prevent widthwise deviation of the magnetic tape 1. As a result the magnetic tape 1 cannot excessively touch flanges of the guide roller 8 and the guide roller 5. This prevents edges of the magnetic tape 1 from being damaged.

The end portion 100a of the auxiliary guide member 100 is positioned in the vicinity of a midway between the inclined pin 6 and the guide roller 7 and the position on the completion of the tape traveling path at the end of loading. This allows the auxiliary guide member 100 to provide an effect of correcting the tape posture similar to the one obtained by the both tape guides when it is at the position at the end of loading, being without moving the inclined pin 6 and the guide roller 7 on the course of loading.

The guide roller 8 and the inclined pin 9 are positioned at predetermined positions so that the magnetic tape 1 is wound to a predetermined angle on the rotatable cylinder 10 (see FIG. 6). After the state in FIG. 9, the arm 23 is moved to touch the inclined pin 6 and the guide roller 7 embedded thereon to the magnetic tape 1 so that the magnetic tape 1 can be detouched a little from the auxiliary guide member 100 to move toward the tape cassette 2. This completes the tape travel path. Right before the completion, the posture of the magnetic tape 1 has been corrected by the auxiliary guide member 100 to the same extent as is corrected by the inclined pin 6 and the guide roller 7. The magnetic tape 1, thus, can have the tape traveling path completed smoothly. At the completion of loading, the auxiliary guide member 100 does not touch the magnetic tape 1 at all, not affecting the tape traveling path.

Figure 11:
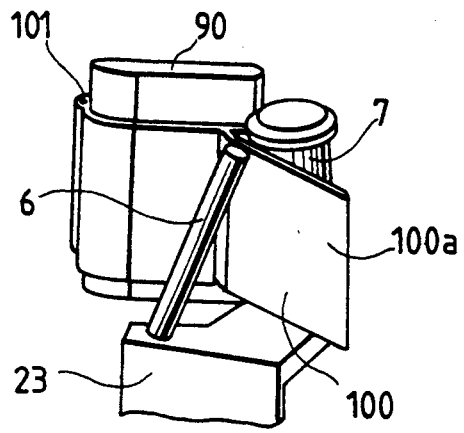
FIG. 11 is an enlarged perspective view of an auxiliary guide member, an inclined pin, a guide roller, and an arm at the time of unloading.

FIG. 11 is a perspective view for illustration of the auxiliary guide member 100, the inclined pin 6, the guide roller 7, and arm 23 at the time of unloading. The auxiliary guide member 100, as shown in the figure, projects the end portion 100a touching the magnetic tape 1 between the inclined pin 6 and guide roller 7 without touching any of the inclined pin 6, the guide roller 7, and the arm 23.

Figure 12:
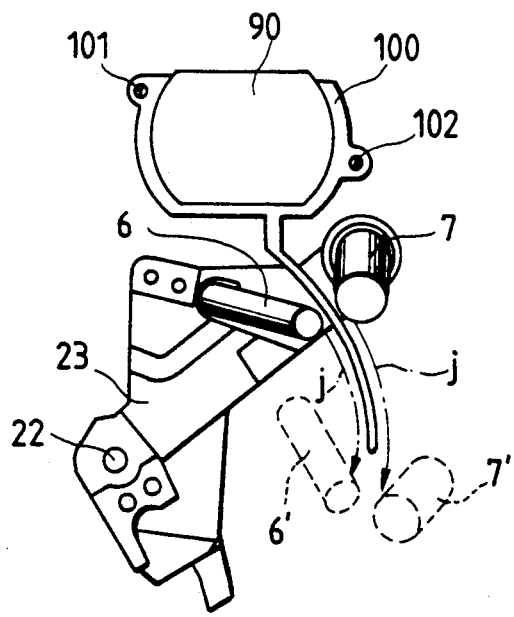
FIG. 12 is a plan view for the assembly shown in FIG. 11.

FIG. 12 is a plan view for the assembly shown in FIG. 11 as looked downward it. Positions of the inclined pin 6 and the guide roller 7 at the end of loading are indicated at 6' and 7' by dotted lines, respectively. Directed line j are tracks of the movements of the inclined pin 6 and the guide roller 7. As the arm 23 is turned around the shaft 22, the inclined pin 6 and the guide roller 7 embedded on the arm 23 are moved to the positions 6' and 7' in an arc. The auxiliary guide member 100 is so shaped and arranged out of the tracks j that it should not prevent the inclined pin 6 and the guide roller 7 from moving. In other words, as no movement of the auxiliary guide member 100 is needed, no movement space for the auxiliary guide member 100 is required as in the conventional apparatus.

Also, the auxiliary guide member 100 in the first embodiment is applicable to an loading arrangement that a tape guide, such as shown in the Japanese Patent Application Laid-Open No. 62-124651, is positioned at the same position in unloading as in the end of loading, it is saved at another position once on the course of loading, the auxiliary guide is made to touch the tape during it, and when the loading comes to completion, the saved tape guide is returned to its original position to touch the tape.

Figure 13:
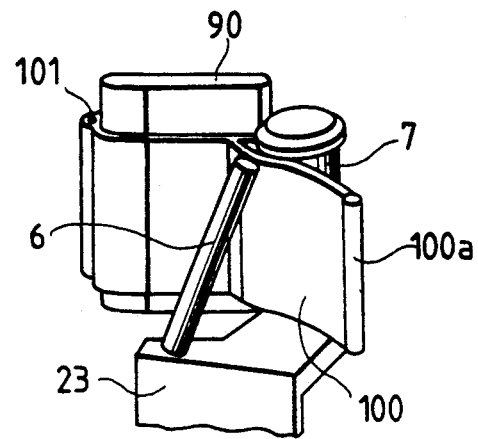
FIG. 13 is a perspective view of another example of the auxiliary guide member.

In FIG. 13 the auxiliary guide member 100 includes an end portion 100a touching the magnetic tape 1 shaped like a pillar. In this case, the auxiliary guide member 100 provides an effect similar to that of the first embodiment, and allows easy correction of the posture of the tape as it has wider contact area with the tape, making far less excessive force to the tape.

Figure 14:
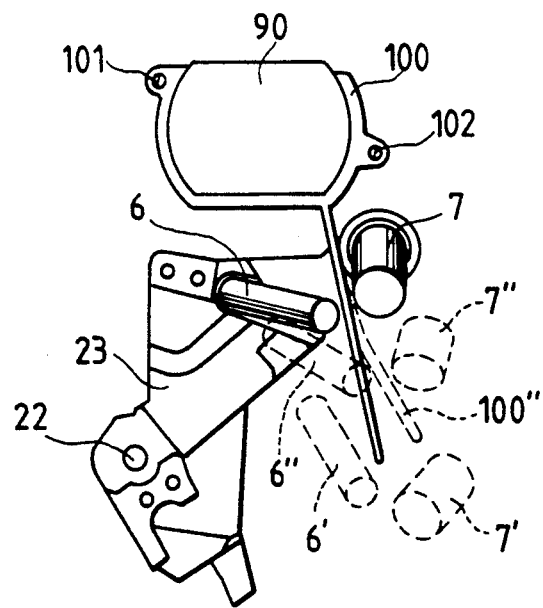
FIG. 14 is a plan view of a further example of the auxiliary guide member.

In FIG. 14 the auxiliary guide member 100 is made of flexible member which is made to touch the tape guide moving in the loading, and can be deformed along with the movement of the tape guide. The inclined pin 6 and the guide roller 7 in the unloading state are moved to positions 6' and 7' denoted by dotted lines at the end of loading, respectively. When the inclined pin and the guide roller are at the positions 6' and 7', respectively, the shape of the auxiliary guide member 100 is denoted by solid line. The auxiliary guide member 100, which touches the moving inclined pin 6" and the guide roller 7", is deformed as shown by dotted line auxiliary guide member 100" along with the tracks of the movements of the inclined pin 6" and guide roller 7". Such operations provide effects similar to the effects obtained in the embodiments described in connection with FIGS. 1 through 12. By forming the auxiliary guide member 100 of flexible member, as described above, it will not prevent the inclined pin 6 and guide roller 7 from moving even if it touches them. This means that the auxiliary guide member 100 can be arranged in very limited narrow space.

The advantages of the present invention consist in particular in the fact that as no space for moving the auxiliary guide, the magnetic tape can be prevented from being damaged in loading with allowing the whole apparatus to be made small, thereby accomplishing the highly reliable tape loading mechanism. As a result, in the so-called tilted loading for forming the tape traveling path having the height difference needed for compact construction, the tape guides can be moved in narrow spaces, thus contributing in making the whole apparatus small to a great extent.

We claim:

1. A tape loading mechanism for a magnetic recording and/or reproducing apparatus in which a magnetic tape is wound to a predetermined angle on a rotatable cylinder having magnetic heads built therein and which has a plurality of tape guides for forming a predetermined tape traveling path, the tape loading mechanism comprising:

a plurality of tape guides movable to wind the magnetic tape on the rotatable cylinder when the magnetic tape is to be loaded; and an auxiliary guide mounted on a chassis of the magnetic recording and/or reproducing apparatus in a position in which the auxiliary guide is made to touch the magnetic tape during a period for which the magnetic tape is being loaded, but the auxiliary guide does not touch the magnetic tape when the magnetic tape has been loaded.

2. A tape loading mechanism as set forth in claim 1, wherein the auxiliary guide extends toward the magnetic tape from between the tape guide moving to touch the magnetic tape during a period for which the magnetic tape is being unloaded so that the magnetic tape is maintained at a predetermined distance.

3. A tape loading mechanism as set forth in claim 1, wherein the auxiliary guide if formed from a plate member.

4. A tape loading mechanism as set forth in claim 2, wherein the auxiliary guide is formed from a plate member.

5. A tape loading mechanism as set forth in claim 1, wherein the auxiliary guide has a pillar-like portion for touching the magnetic tape.

6. A tape loading mechanism as set forth in claim 2, wherein the auxiliary guide has a pillar-like portion for touching the magnetic tape.

7. A tape loading mechanism as set forth in claim 3, wherein the auxiliary guide has a pillar-like portion for touching the magnetic tape.

8. A tape loading mechanism as set forth in claim 4, wherein the auxiliary guide has a pillar-like portion for touching the magnetic tape.

9. A tape loading mechanism as set forth in claim 1, wherein the auxiliary guide is arranged at a position separated from moving paths of the tape guides so that the auxiliary guide does not touch the tape guides during the period in which the magnetic tape is being loaded.

10. A tape loading mechanism as set forth in claim 2, wherein the auxiliary guide is arranged at a position separated from moving paths of the tape guides so that the auxiliary guide does not touch the tape guides during the period in which the magnetic tape is being loaded.

11. A tape loading mechanism as set forth in claim 3, wherein the auxiliary guide is arranged at a position separated from moving paths of the tape guides so that the auxiliary guide does not touch the tape guides during the period in which the magnetic tape is being loaded.

12. A tape loading mechanism as set forth in claim 4, wherein the auxiliary guide is arranged at a position separated from moving paths of the tape guides so that the auxiliary guide does not touch the tape guides during the period in which the magnetic tape is being loaded.

13. A tape loading mechanism as set forth in claim 5, wherein the auxiliary guide is arranged at a position separated from moving paths of the tape guides so that the auxiliary guide does not touch the tape guides during the period in which the magnetic tape is being loaded.

14. A tape loading mechanism as set forth in claim 6, wherein the auxiliary guide is arranged at a position separated from moving paths of the tape guides so that the auxiliary guide does not touch the tape guides during the period in which the magnetic tape is being loaded.

15. A tape loading mechanism as set forth in claim 6, wherein the auxiliary guide is arranged at a position separated from moving paths of the tape guides so that the auxiliary guide does not touch the tape guides during the period in which the magnetic tape is being loaded.

16. A tape loading mechanism as set forth in claim 8, wherein the auxiliary guide is arranged at a position separated from moving paths of the tape guides so that the auxiliary guide does not touch the tape guides during the period in which the magnetic tape is being loaded.

17. A tape loading mechanism for a magnetic recording and/or reproducing apparatus in which a magnetic tape is wound to a predetermined angle on a rotatable cylinder having magnetic heads built therein and which has a plurality of tape guides for forming a predetermined tape traveling path, the tape loading mechanism comprising:
a plurality of tape guides which are moved to wind the magnetic tape on the rotatable cylinder when the magnetic tape is to be loaded; and
an auxiliary guide mounted on a chassis of the magnetic recording and/or reproducing apparatus in a position in which the auxiliary guide is made to touch the magnetic tape during a period for which the magnetic tape is being loaded, but, the auxiliary guide does not touch the magnetic tape when the magnetic tape has been loaded, and
wherein the auxiliary guide is formed of a flexible member so that the auxiliary guide can be deformed along with tracks of movements of the tape guide when the auxiliary guide touches the moving tape guides during the period in which the magnetic tape is being loaded.

18. A tape loading mechanism for a magnetic recording and/or reproducing apparatus in which a magnetic tape is wound to a predetermined angle on a rotatable cylinder having magnetic heads built therein and which has a plurality of tape guides for forming a predetermined tape traveling path, the tape loading mechanism comprising:
a plurality of tape guides which are moved to wind the magnetic tape on the rotatable cylinder when the magnetic tape is to be loaded; and
an auxiliary guide mounted on a chassis of the magnetic recording and/or reproducing apparatus in a position in which the auxiliary guide is made to touch the magnetic tape during a period for which the magnetic tape is being loaded, but the auxiliary guide does not touch the magnetic tape when the magnetic tape has been loaded;
wherein the auxiliary guide extends toward the magnetic tape from between the tape guides moving to touch the magnetic tape during the period for which the magnetic tape is being loaded so that the magnetic tape is maintained at a predetermined distance, and
wherein the auxiliary guide is formed of a flexible member so that the auxiliary guide can be deformed along with tracks of movements of the tape guides when the auxiliary guide touches the moving tape guides during the period for which the magnetic tape is being loaded.

19. A tape loading mechanism for a magnetic recording and/or reproducing apparatus in which a magnetic tape is wound to a predetermined angle on a rotatable cylinder having magnetic heads built therein and which has a plurality of tape guides for forming a predetermined tape traveling path, the tape loading mechanism comprising:
a plurality of tape guides which are moved to wind the magnetic tape on the rotatable cylinder when the magnetic tape is to be loaded; and
an auxiliary guide mounted on a chassis of the magnetic recording and/or reproducing apparatus in a position in which the auxiliary guide is made to touch the magnetic tape during a period for which the magnetic tape is being loaded, but the auxiliary guide does not touch the magnetic tape when the magnetic tape has been loaded;
wherein the auxiliary guide is formed from a plate member, and
wherein the auxiliary guide is formed of a flexible member so that the auxiliary guide can be deformed along with tracks of movements of the tape guides when the auxiliary guide touches the moving tape guides during the period in which the magnetic tape is being loaded.

20. A tape loading mechanism for a magnetic recording and/or reproducing apparatus in which a magnetic tape is wound to a predetermined angle on a rotatable cylinder having magnetic heads built therein and which has a plurality of tape guides for forming a predetermined tape traveling path, the tape loading mechanism comprising:
- a plurality of tape guides movable to wind a magnetic tape on the rotatable cylinder when the magnetic tape is to be loaded; and
- an auxiliary guide mounted on a chassis of the magnetic recording and/or reproducing apparatus in a position in which the auxiliary guide is made to touch the magnetic tape for a period for which the magnetic tape is being loaded, but the auxiliary guide does not touch the magnetic tape when the magnetic tape has been loaded;
- wherein the auxiliary guide extends toward the magnetic tape from between the tape guides moving to tough the magnetic tape during the period for which the magnetic tape is loaded so that the magnetic tape is maintained at a predetermined distance,
- wherein the auxiliary guide is formed from a plate member, and
- wherein the auxiliary guide is formed of a flexible member so that the auxiliary guide can be deformed along with tracks of movements of the tape guides when the auxiliary guide touches the magnetic tape guides during the period in which the magnetic tape is being loaded.

21. A tape loading mechanism for a magnetic recording and/or reproducing apparatus in which a magnetic tape is wound to a predetermined angle on a rotatable cylinder having magnetic heads built therein and which has a plurality of tape guides for forming a predetermined tape traveling path, the tape loading mechanism comprising:
- a plurality of tape guides movable to wind the magnetic tape on the rotatable cylinder when the magnetic tape is to be loaded; and
- an auxiliary guide mounted on a chassis of the magnetic recording and/or reproducing apparatus in a position in which the auxiliary guide is made to touch the magnetic tape during a period for which the magnetic tape is being loaded, but the auxiliary guide does not touch the magnetic tape when the magnetic tape has been loaded;
- wherein the auxiliary guide has a pillar-like portion for touching the magnetic tape, and
- wherein the auxiliary guide is formed of a flexible member so that the auxiliary guide can be deformed along with tracks of movements of the tape guides when the auxiliary guide touches the moving tape guides during the period in which the magnetic tape is being loaded.

22. A tape loading mechanism for a magnetic recording and/or reproducing apparatus in which a magnetic tape is wound to a predetermined angle on a rotatable cylinder having magnetic heads built therein and which has a plurality of tape guides for forming a predetermined tape traveling path, the tape loading mechanism comprising:
- a plurality of tape guides movable to wind the magnetic tape on the rotatable cylinder when the magnetic tape is to be loaded; and
- an auxiliary guide mounted on a chassis of the magnetic recording and/or reproducing apparatus in a position in which the auxiliary guide is made to touch the magnetic tape during a period for which the magnetic tape is being loaded, but the auxiliary guide does not touch the magnetic tape when the magnetic tape has been loaded;
- wherein the auxiliary guide extends toward the magnetic tape from between the tape guides moving to touch the magnetic tape during the period for which the magnetic tape is being loaded so that the magnetic tape is maintained at a predetermined distance,
- wherein the auxiliary guide has a pillar-like portion for touching the magnetic tape, and
- wherein the auxiliary guide is formed of a flexible member so that the auxiliary guide can be deformed along with tracks of movements of the tape guides when the auxiliary guide touches the moving tape guides during the period for which the magnetic tape is being loaded.

23. A tape loading mechanism for a magnetic recording and/or reproducing apparatus in which a magnetic tape is wound to a predetermined angle on a rotatable cylinder having magnetic heads built therein and which has a plurality of tape guides for forming a predetermined tape traveling path, the tape loading mechanism comprising:
- a plurality of tape guides movable to wind the magnetic tape on the rotatable cylinder when the magnetic tape is to be loaded; and
- an auxiliary guide mounted on a chassis of the magnetic recording and/or reproducing apparatus in a position in which the auxiliary guide is made to touch the magnetic tape during a period for which the magnetic tape is being loaded, but the auxiliary guide does not touch the magnetic tape when the magnetic tape has been loaded;
- wherein the auxiliary guide has a pillar-like portion for touching the magnetic tape, and
- wherein the auxiliary guide is formed of a flexible member so that the auxiliary guide can be deformed along with tracks of movements of the tape guides when the auxiliary guide touches the moving tape guides during the period in which the magnetic tape is being loaded.

24. A tape loading mechanism for a magnetic recording and/or reproducing apparatus in which a magnetic tape is wound to a predetermined angle on a rotatable cylinder having magnetic heads built therein and which has a plurality of tape guides for forming a predetermined tape traveling path, the tape loading mechanism comprising:
- a plurality of tape guides which are moved to wind the magnetic tape on the rotatable cylinder when the magnetic tape is to be loaded; and
- an auxiliary guide mounted on a chassis of the magnetic recording and/or reproducing apparatus in a position in which the auxiliary guide is made to touch the magnetic tape during a period for which the magnetic tape is being loaded, but the auxiliary guide does not touch the magnetic tape when the magnetic tape has been loaded;
- wherein the auxiliary guide is formed from a plate member,
- wherein the auxiliary guide has a pillar-like portion for touching the magnetic tape, and
- wherein the auxiliary guide is formed of a flexible member so that the auxiliary guide can be deformed along with tracks of movements of the tape guides when the auxiliary guide touches the moving tape guides during the period in which the magnetic tape is being loaded.

* * * * *